Patented Sept. 11, 1951

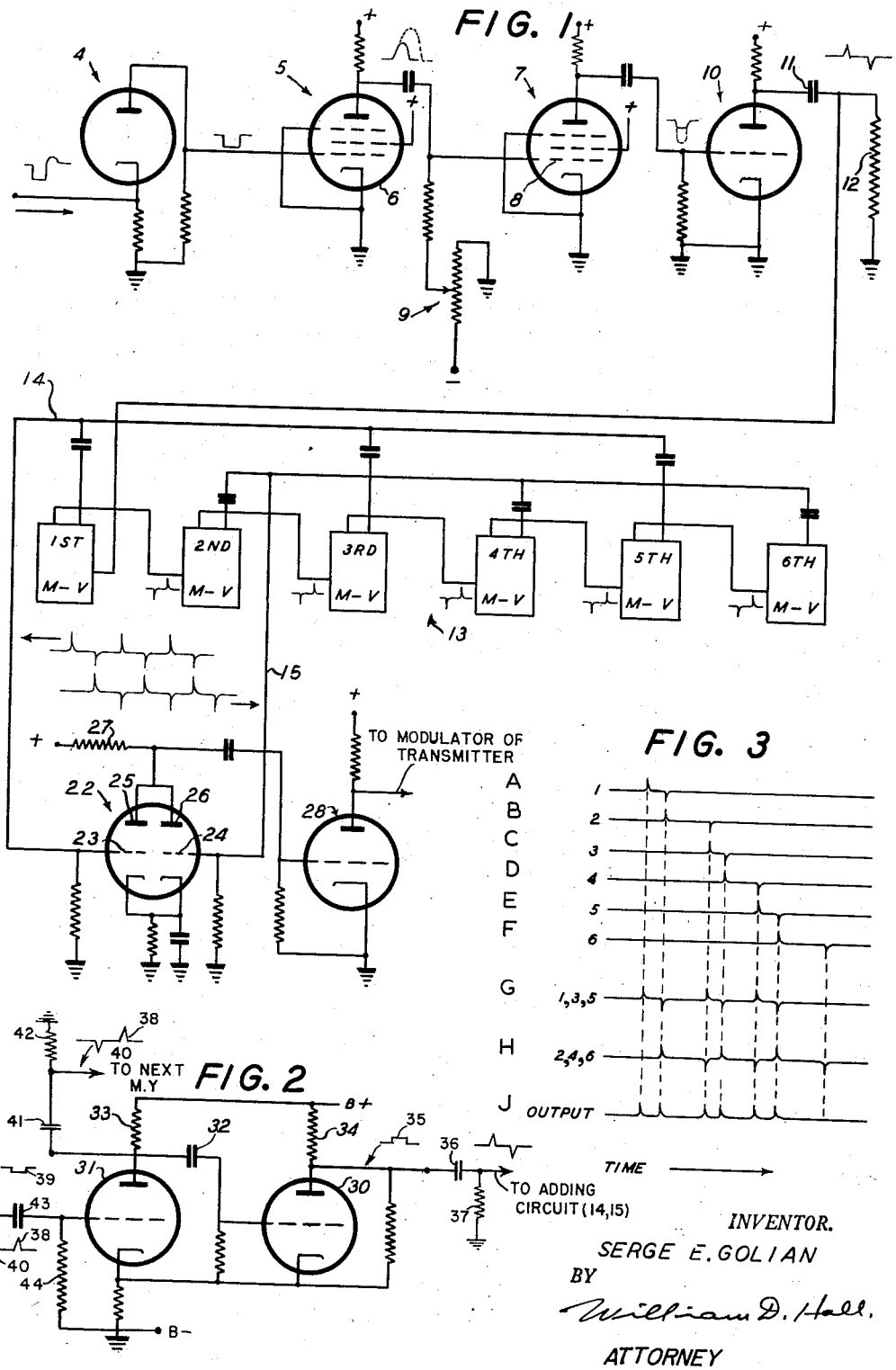

2,567,844

UNITED STATES PATENT OFFICE 2,567,844

COMMUNICATION SYSTEM

Serge E. Golian, Cambridge, Mass., assignor, by mesne assignments, to the United States of America as represented by the Secretary of War Application August 8, 1945, Serial No. 609,658

8 Claims. (Cl. 177—380)

The present invention relates in general to radio navigational aids and more particularly to discriminating and coding circuits for such apparatus.

It is one of the objects of my invention to provide a circuit for effectively developing for transmission a series of pulses of substantially equal time duration, but separated by time intervals in accordance with a predetermined selected code.

In certain applications of radio circuits to navigation of aircraft or surface vessels, it is desirable to transmit from a fixed position radio energy in the form of pulses in a predetermined sequence or code which can be varied as the occasion may demand. By use of suitable equipment on board an aircraft or surface vessel, it is possible to determine the location of the craft in relation to the fixed transmitter and to identify the latter positively by observaion of the sequence of its transmitted pulses. Therefore it is another of the objects of my invention to provide apparatus by which such a pulse sequence may be controlled and coded.

It is further desirable, in some instances, to have the operation of such navigational aids as described above automatic, in that, upon receipt of a predetermined sort of signal, a reply in coded form is transmitted and may be intercepted by the interrogating source. Hence, it is necessary to provide means for differentiating between received signals in order that only signals of a certain type will operate the transmitter. My invention, therefore, provides radio responder station apparatus which is designed to select from a plurality of received signals only those of a certain predetermined character, i. e., consisting of pulses of radio energy longer in duration than a chosen limiting value, which are expressly intended to interrogate the fixed transmitting apparatus. This provision comprises another of the objects of my invention.

In general, in one embodiment of a radio responder station in accordance with my invention the output signal of a radio receiving system, consisting of video pulses of varying time duration, is applied to an integrating stage. The output of this stage consists of pulses which have amplitudes proportional to the time widths of the applied pulses. A discriminator stage consisting of a biased amplifier removes those pulses of less than a certain predetermined amplitude and the remaining pulses are amplified and differentiated to form trigger pulses for triggering the first of a series of single-stroke multivibrators. Each multivibrator in the series triggers the succeeding multivibrator and the output of each is differentiated to yield narrow positive and negative pulses. All of the pulses from the multivibrators are combined and there are removed from the combined signal all pulses of one polarity. The result is that there is provided a predeterminable series of pulses of like polarity which may be used to control the operation of a transmitter, these pulses having been generated in response to received signals of a predetermined duration or greater which have originated at an interrogating station, for instance.

The invention will be understood best by reference to the accompanying drawings in which, Fig. 1 is a partially schematic and partially circuit representation of one embodiment of my invention;

Fig. 2 is a form of multivibrator which may be utilized in the invention; and

Fig. 3 is a representation of the voltage waveforms appearing at various points in Fig. 1 which further shows their proper time relationship.

Referring to Fig. 1 there is shown one embodiment of the present invention. The input, in the general form of negative video pulses from a radio receiver, is passed through a diode clipper stage 4 which removes any positive pulse portions. The negative pulses which may, in some embodiments, vary in duration over a range of several microseconds are then applied to an integrating stage 5. Vacuum tube 6 has usually a plate voltage of very low value and in actual practice has at times been in the neighborhood of six volts. The video pulses charge a distributed tube capacitance of thermionic tube 6 which acts as the capacitance element of an integrating circuit. It is possible to use the distributed capacitance alone because the duration of the applied pulses is of the order of one or two microseconds. The rise of voltage across this capacitance is approximately linear over the time of application of each pulse, and hence the output of the integrating stage is a voltage pulse, the amplitude of which is generally proportional to the duration of the applied pulse.

The following stage 7 is a biased amplifier, the control grid 8 of which is held below cutoff by any desired amount by a suitable biasing arrangement indicated by 9. Because of the bias provided, only those pulses of sufficient amplitude to raise the grid above cutoff potential are passed and amplified by this circuit. Further amplification is provided, if desired, by stage 10, and the output pulses thereof are then differentiated by capacitance 11 and resistance 12 to provide trigger pulses for the first in a series of single-stroke multivibrators which comprises the coding circuit 13. The operation thereof will be explained with reference to Fig. 2.

The outputs of the first, third and fifth multivibrators, after being differentiated, are tied into a common lead 14 which is taken to grid 23 of the adding circuit 22. Similarly the outputs of the second, fourth and sixth multivibrators are tied to lead 15 which is connected to grid 24 of the adding circuit 22. Therefore, the signal voltage on each grid of the adding circuit consists of an algebraic sum of the outputs of alternate multivibrators.

The adding circuit 22 consists of a double triode biased in the vicinity of cutoff and with anodes 25 and 26 connected to a common plate load resistance 27. The negative portions of the input waves, because of the relatively high bias, are thus clipped off and the sum of the positive portions appears across the load resistance 27. The output of the adding circuit is therefore a train of negative pulses occurring at controllable intervals. This wave train is inverted in a suitable amplifying circuit 28 and used to control the operation of a radio frequency transmitter system.

Fig. 2 shows a typical multivibrator circuit for use with the present invention. Such a multivibrator generates a single rectangular pulse, the duration of which is controlled by predetermined circuit constants. Not being self-triggering, the circuit is normally in a quiescent state with one tube 30 conducting and the other tube 31 nonconducting. The application of a trigger pulse of proper polarity and amplitude to the grid of tube 31 will cause it to conduct and the conducting tube 30 to cut off. After a period of time, determined principally by the value of capacitance 32 and the circuit resistances the tubes return to their original stable quiescent state, remaining thus until the arrival of the next trigger pulse. In this cycle of operation a substantially rectangular voltage pulse is generated across each of load resistances 33 and 34, a negative pulse being developed across resistance 33 and a positive pulse across resistance 34, said positive pulse being shown by wave form 35. Therefore, either a positive or a negative output pulse may be obtained.

The rectangular positive waves 35 developed in the output of each mutivibrator are differentiated by an R-C network consisting of capacitor 36 and resistor 37 and are applied to the adding circuits 22 over leads 14 or 15. The pulse 38 of the differentiated, negative going rectangular wave 39, obtained across resistance 33, corresponds in time to the trailing edge of the wave and serves as a trigger pulse for the succeeding multivibrator, and so on. The pulse 40 of the differentiated rectangular wave 39, corresponding to the leading edge of the wave and of opposite polarity to pulse 38, has no triggering effect on the succeeding multivibrator. The differentiating circuit for the square wave pulse 39 of tube 31 comprises capacitor 41 and resistance 42. Capacitor 43 and resistance 44 serve merely as a coupling circuit between succeeding multivibrator circuits. Therefore, each multivibrator pulse is delayed behind the original trigger by an amount equal to the sum of the pulse durations of the preceding multivibrators. Any number of such multivibrators may be used; in the present embodiment six are used. The duration of the output pulse of each multivibrator, being readily variable with the circuit constants, need not be identical in any two or more of the multivibrators.

In Fig. 3 are shown in their proper time relation the differentiated multivibrator outputs in uncombined and combined form. Each output is designated by a number corresponding to the multivibrator of the coding circuit which produced it. Accordingly, curves A through F show the individual outputs of multivibrators 1 through 6. Curve G shows the voltage waveform existing in lead 14, being the algebraic sum of curves A, C, and E. Similarly, curves B, D, and F are summed in lead 15, the result being shown in curve H. As explained hereinbefore, the negative peaks are clipped in the adding stage 22. Hence as curve J shows, only positive peaks exist in the output of the final amplifier 28. This is the coded sequence used for modulating a radio transmitter.

Thus it will be seen that the circuit as described responds only to interrogating signal of a special character, develops a series of voltage pulses, and combines them in a predetermined pattern for use in controlling the operation of a radio transmitter.

It will be apparent to those skilled in the art that changes may be made in specific circuit details without departing from the principle of my invention, and I claim all such modifications as may fall fairly within the spirit and scope of my invention as set forth in the hereinafter appended claims.

What I claim is:

1. In a radio automatic responder station, a plurality of single-stroke multivibrators serially connected, each of said multivibrators being independently adjustable, means for receiving radiant energy pulses of varying pulse-width, means for deriving, from said pulses of varying pulse-width, pulses all of the same polarity, a pulse-width discriminator to eliminate pulses of less than a predetermined width, means for impressing the pulses all of the same polarity onto said pulse-width discriminator, means for deriving further signals from the output of said pulse-width discriminator which are substantially a derivative of said output thereof, means to initially trigger one of said multivibrators with the further derived signals, means to successively trigger each of said multivibrators in the serial connection after the initial triggering, means for differentiating the output of each multivibrator, means for combining said differentiated multivibrator outputs, modulating means, and means for impressing the combined derivatives of the outputs from said multivibrators onto said modulating means.

2. The combination in an automatic radio responder station comprising a receiver for interrogation signals, the output of said receiver yielding video pulses of varying time duration, means for producing voltage pulses whose amplitudes are proportional to the time duration of said video pulses, discriminating means for eliminating those voltage pulses below a predetermined amplitude level, means for deriving sharp trigger pulses from the remaining said voltage pulses, means for generating a train of modulation pulses in a time sequence according to a prescribed code in response to each of said trigger pulses, and means for applying said train of modulation pulses to a transmitter.

3. The combination in an automatic radio responder station comprising a receiver for interrogation signals, the output of said receiver yielding video pulses of varying time duration, an integrator for converting said video pulses into voltage pulses whose amplitudes are proportional to the time duration of said video pulses, discriminating means for eliminating those voltage pulses below a predetermined amplitude level, means for deriving sharp trigger pulses from the remaining voltage pulses, means for generating a train of modulation pulses in a time sequence according to a prescribed code in response to each of said trigger pulses, and means for applying said train of modulation pulses to a transmitter.

4. The combination in an automatic radio responder station comprising a receiver for interrogation signals, the output of said receiver yielding video pulses of varying time duration, an integrator for converting said video pulses into voltage pulses whose amplitudes are proportional to the time duration of said video pulses, a discriminator including an amplifier tube biased at a level for eliminating those voltage pulses of less than a predetermined amplitude, means for deriving short trigger pulses from the output of said discriminator, means for generating a train of modulation pulses in a time sequence according to a prescribed code in response to each of said trigger pulses, and means for applying said train of modulation pulses to a transmitter.

5. The combination in an automatic radio responder station comprising a receiver for interrogation signals, the output of said receiver yielding video pulses of varying time duration, an integrator for converting said video pulses into voltage pulses whose amplitudes are proportional to the time duration of said video pulses, a discriminator including an amplifier biased at a level for eliminating those voltage pulses of less than a predetermined amplitude, a differentiating circuit to form narrow trigger pulses from the remaining voltage pulses, means for generating a train of modulation pulses in a time sequence according to a prescribed code in response to each of said trigger pulses, and means for applying said train of modulation pulses to a transmitter.

6. The combination in an automatic radio responder station comprising a receiver for interrogation signals, the output of said receiver yielding video pulses of varying time duration, means to derive trigger pulses from those of said video pulses whose time duration is greater than a predetermined value, means to generate a train of modulation pulses in a time sequence according to a prescribed code in response to each of said trigger pulses, said generating means including a plurality of single-stroke, independently-adjustable multivibrators for generating rectangular waves, said multivibrators being arranged in serial connection, the first of said multivibrators being actuated by said trigger pulses, differentiating means in the output of each of said multivibrators to produce pulses corresponding to the leading and trailing edges of said rectangular waves, the trailing edge pulse of each multivibrator serving to trigger the succeeding multivibrator, and means to combine the output of said generating means into a train of modulation, and means for applying said train of modulation pulses to a transmitter.

7. Means to transmit a train of pulses in a time sequence according to a prescribed code in response to a trigger pulse comprising a plurality of single-stroke, independently-adjustable multivibrators for generating rectangular waves, said multivibrators being arranged in serial connection, the first of said multivibrators being actuated by said trigger pulse, a differentiating network in the output of each of said multivibrators to produce pulses corresponding to the leading and trailing edges of said rectangular waves, the trailing edge pulse of each multivibrator serving to trigger the succeeding multivibrator, an adding circuit including a double triode discharge device, the respective grids of said device being biased in the vicinity of cutoff, a common load resistor connected to the anodes of said discharge device, means for applying the output from alternate multivibrators to one grid of said discharge device, means for applying the output from the remaining multivibrators to the other grid of said discharge device whereby the sum of the output simultaneously applied to the respective grids of said discharge device appears across said load resistor to provide a train of modulation pulses occurring at controllable intervals, and means to apply said train of modulation pulses to a transmitter.

8. The combination in an automatic radio responder station comprising a receiver for interrogation signals, the output of said receiver yielding signal pulses of varying time duration, means to derive trigger pulses from those of said signal pulses whose time duration is greater than a predetermined value, means to generate a train of modulation pulses in a time sequence according to a prescribed code in response to each of said trigger pulses, and means for applying said train of modulation pulses to a transmitter; wherein said means to generate a train of modulation pulses includes a plurality of series-connected single-stroke rectangular wave generators, the first of said generators being actuated by said trigger pulses, and differentiating means in the output of each of said generators to produce pulses corresponding to the leading and trailing edges of said rectangular waves, and means responsive only to the trailing edge pulse of each generator to trigger the succeeding generator.

SERGE E. GOLIAN.

REFERENCES CITED

The following references are of record in the file of this patent:

UNITED STATES PATENTS

| Number | Name | Date |
| --- | --- | --- |
| 1,172,526 | Harlow | Feb. 22, 1916 |
| 1,630,900 | Michoud | May 31, 1927 |
| 1,957,672 | Saunders | May 8, 1934 |
| 2,266,401 | Reeves | Dec. 16, 1941 |
| 2,359,447 | Seeley | Oct. 3, 1944 |
| 2,398,771 | Compton | Apr. 23, 1946 |
| 2,405,843 | Moe | Aug. 13, 1946 |
| 2,409,229 | Smith | Oct. 15, 1946 |
| 2,415,359 | Loughlin | Feb. 4, 1947 |
| 2,418,521 | Morton | Apr. 8, 1947 |
| 2,424,481 | McCoy | July 22, 1947 |